US006798423B2

United States Patent
Wilkins, Jr. et al.

(10) Patent No.: US 6,798,423 B2
(45) Date of Patent: Sep. 28, 2004

(54) PRECISION PERSPECTIVE FLIGHT GUIDANCE SYMBOLOGY SYSTEM

(75) Inventors: Robert Ryan Wilkins, Jr., Wilmington, DE (US); Kenneth Scott Harris, Wilmington, DE (US); Curtis Wayne Walz, Elkton, MD (US)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 09/975,624

(22) Filed: Oct. 11, 2001

(65) Prior Publication Data

US 2003/0071828 A1 Apr. 17, 2003

(51) Int. Cl.[7] ............................................. G09G 5/32
(52) U.S. Cl. ..................................... 345/618; 340/980
(58) Field of Search .............................. 345/618–619, 345/419, 607–609; 340/945–983; 342/29–41; 434/28–71

(56) References Cited

U.S. PATENT DOCUMENTS

| | | | | |
|---|---|---|---|---|
| 5,150,117 A | * | 9/1992 | Hamilton et al. | 340/973 |
| 5,179,377 A | * | 1/1993 | Hancock et al. | 340/961 |
| 5,227,786 A | * | 7/1993 | Hancock et al. | 340/961 |
| 5,289,185 A | * | 2/1994 | Ramier et al. | 340/971 |
| 5,420,582 A | * | 5/1995 | Kubbat et al. | 340/974 |
| 5,745,863 A | * | 4/1998 | Uhlenhop et al. | 701/14 |
| 5,798,713 A | * | 8/1998 | Viebahn et al. | 340/974 |
| 6,317,059 B1 | * | 11/2001 | Purpus et al. | 340/974 |
| 6,320,579 B1 | * | 11/2001 | Snyder et al. | 345/419 |

OTHER PUBLICATIONS

International Search Report dated Oct. 11, 2001 for PCT/US02/25635, 3 pages.
Factors Influencing the Design of Perspective Flight Path Displays for Guidance and Navigation, Author E. Theunissen, (pp. 241–254).

* cited by examiner

Primary Examiner—Jeffery Brier
Assistant Examiner—Thu Thao Havan
(74) Attorney, Agent, or Firm—Harness, Dickey & Pierce, P.L.C.

(57) ABSTRACT

A predictive flight path symbology system for increasing pilot situational awareness of an aircraft. The system includes a pilot display, and a precision pathway flight guidance (PPFG) symbology set displayed on the pilot display. The PPFG symbology set includes broken line symbols representing an open tunnel and providing flow field data, a half-bracket symbol to indicate that the aircraft is no longer in the open tunnel represented by the broken line symbols, and a quickened flight path vector (QFPV) symbol to provide the pilot with predictive flight path information.

21 Claims, 2 Drawing Sheets

OFF COURSE BRACKET SYMBOL

PRECISION PERSPECTIVE FLIGHT GUIDANCE SYMBOLOGY SYSTEM

FIELD OF INVENTION

Then invention related generally to aircraft guidance systems, and more particularly to a guidance display that uses a predictive flight path, or performance, symbology set.

BACKGROUND OF THE INVENTION

In order to reduce tracking errors and pilot workload, a pilot must be provided with increased situational awareness of an aircraft the pilot is flying with respect to a desired flight path. Additionally the pilot must be aware of the actual aircraft performance, or flight path vector (FPV), the desired, or commanded, aircraft performance, and the predicted aircraft performance. The use of a perspective display with a predictive flight path, or performance, symbology set provides increased situational awareness. Perspective displays with predictive symbology permit a pilot to "see" what will be required, or demanded, of the aircraft to maintain a desired flight path, as well as where the aircraft will be in a finite period of time. With the increased situational awareness, the pilot's workload is lower, thereby permitting better flight management.

Flight director guidance for critical maneuvers, such as those maneuvers with very small, or reduced, margins for error, is essential for precision navigation requirements. Known guidance symbology, such as Delta-Veebar and Two-Bar, work well, but are limited in their ability to display future flight path information to the pilot and/or the results of pilot control input. Both Delta-Veebar and Two-Bar guidance symbology are based on compensatory tracking tasks.

The traditional symbology used for instrument approaches in vertical flight aircraft, such as rotorcraft or tiltrotors, is based on compensatory tracking tasks. Compensatory tracking tasks are derived by monitoring actual aircraft attitude against commanded attitude during flight, and actual cross-track error against commanded cross-track during flight. Guidance errors are generally computed as the difference between guidance commands and sensed aircraft state. The errors are sent to flight director algorithms, which generate steering commands. These commands appear as flight director symbology on a cockpit display and direct the pilot where to position the lateral stick (roll), thrust control lever (power), and the longitudinal stick (pitch). If the pilot responds with the appropriate control inputs to satisfy the flight director steering commands, the aircraft will converge on the reference values selected.

Symbology based on compensatory tracking tasks, are designed to provide a pilot with command guidance instructing a pilot to make flight adjustments to guide an aircraft from an off-course situation to return to a nominal, or null error, solution. Compensatory tracking does not provide the pilot with information indicating how far off course the plane is, nor what flight control input is required to regain course centerline. Therefore, the pilot must constantly monitor command and the results of control inputs. Furthermore, compensatory tracking does not provide flight path predictability, and displays that utilize compensatory symbology require much cognitive processing by the pilot and cause heavy pilot mental workload leading to errors, especially in high workload constrained terminal areas, or during low altitude operations. For example, excessive pilot mental workload can lead to full-scale deflection errors, or total loss of situational control resulting in a maximum deviation mandated missed approach. Thus, compensatory symbology often creates display clutter and high pilot cognitive workload, which increases the risk of flight technical errors (FTE's).

To overcome the shortcomings of symbology based on compensatory tracking tasks, perspective display sets, or three-dimensional (3D) displays, have been developed to some degree with varying symbology. Most perspective display sets have been 3D tunnels, consisting of a series of rectangles connected by lines through the corners.

More recent pathway "tunnel" designs have produced four-dimensional capabilities where the guidance is a pathway produced by four perspective lines through the corners of a command plane, into which a flight path vector (FPV) symbol is placed.

These perspective symbology sets accomplish their intended tasks, but nevertheless result in additional display clutter. Therefore, it is desirable to develop a perspective display set that yields the same, or better, performance results as current perspective symbology sets, but causes less display clutter, reduces pilot work load, and reduces FTE's.

BRIEF SUMMARY OF THE INVENTION

In one preferred embodiment, a predictive flight path symbology system is provided for increasing pilot situational awareness of an aircraft. The system includes a pilot display, and a precision pathway flight guidance (PPFG) symbology set displayed on the pilot display. The PPFG symbology set includes broken line symbols representing an open guidance tunnel and providing flow field data, a half-bracket symbol to indicate that the aircraft is no longer in the open tunnel represented by the broken line symbols and the direction to turn to re-intercept the guidance tunnel, and a quickened flight path vector (QFPV) symbol to provide the pilot with predictive flight path information.

In another embodiment, a method is provided for increasing pilot situational awareness of an aircraft utilizing a predictive flight path symbology set. The method includes utilizing an open tunnel bounded by broken lines symbol to provide flow field data, utilizing a half-bracket symbol to indicate that the aircraft is no longer in a tunnel, and utilizing a quickened flight path vector (QFPV) symbol to provide the pilot with predictive flight path information.

In yet another embodiment, a precision pathway flight guidance (PPFG) symbology set is provided for increasing pilot situational awareness of an aircraft. The PPFG symbology set includes broken line symbols representing an open tunnel and providing flow field data, a half-bracket symbol to indicate that the aircraft is no longer in the open tunnel represented by the broken line symbols, and a quickened flight path vector (QFPV) symbol to provide the pilot with predictive flight path information. The PPFG symbology set further includes a quickened command reference frame configured to indicate a commanded location in which the pilot is to locate the QFPV in order to satisfy on-course tracking requirements, a longitudinal pitch trim symbol configured to maintain a desired pitch of the aircraft by the pilot adjusting the trim of the aircraft to align the longitudinal pitch trim symbol with the QFPV, and a power trim symbol configured to maintain a desired trim of the aircraft by the pilot adjusting power of the aircraft in order to position the power trim symbol level the QFPV.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of the preferred embodiments is merely exemplary in nature and is in no way intended to limit the invention, its application, or uses.

Figure 1:
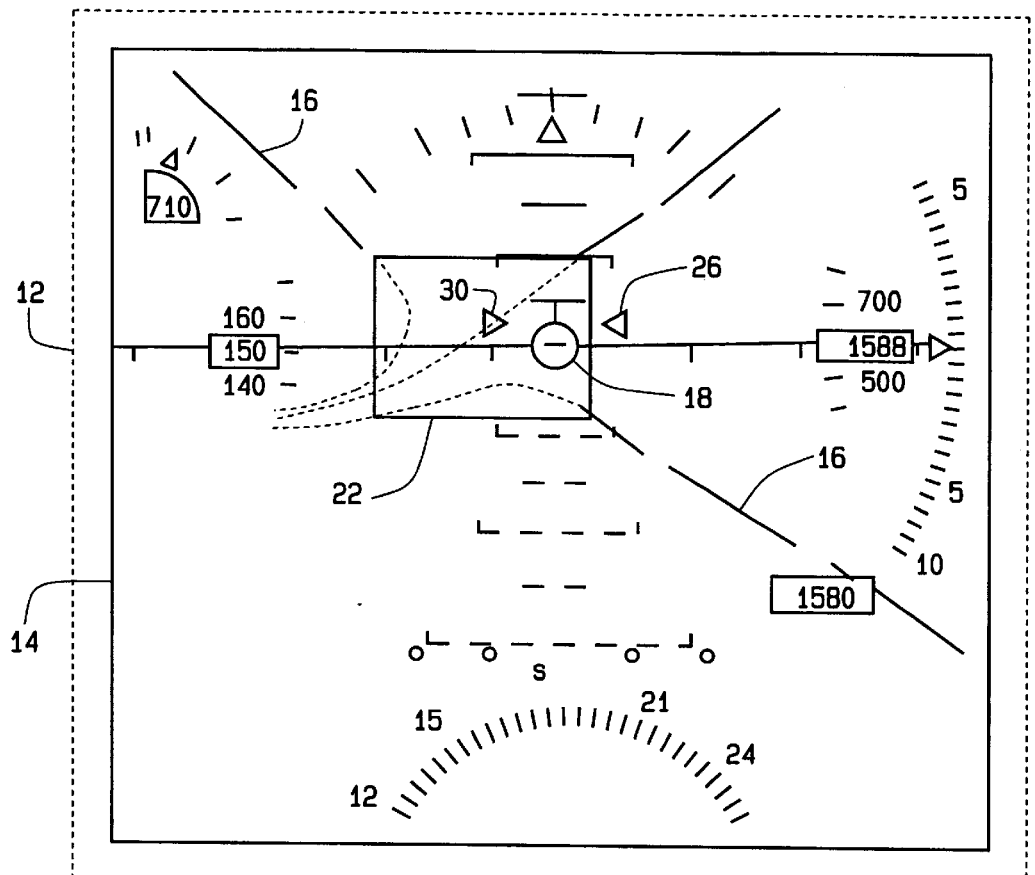
FIG. 1 is a graphical representation of a predictive flight path symbology system including a flight path vector based precision pathway flight guidance (PPFG) symbology set, used in accordance with one embodiment of the present invention.

Referring to FIG. 1, a graphical representation of a predictive flight path symbology system 10, in accordance with an exemplary embodiment of the present invention is shown. System 10 includes a FPV based precision pathway flight guidance (PPFG) symbology set 12 and a pilot display 14, on which PPFG symbology set 12 is displayed. PPFG symbology set 12 includes an open tunnel bounded by broken tunnel lines 16 that provide flow field data, such as a Boeing Philadelphia broken line open tunnel, a 'quickened' flight path vector (QFPV) symbol 18 that indicates predictive aircraft state, such as a Delft OFPV, and a 'quickened' command reference frame 22 symbol into which a pilot is to place QFPV 18, such as a Munich command reference frame. Additionally, PPFG symbology set 12 includes a pitch trim cue, or symbol, 26, such as a NASA Ames longitudinal trim command cue, that is utilized by the pilot to maintain a desired aircraft pitch, and a power trim cue, or symbol, 30, such as an Ames power cue, that is utilized by the pilot to maintain a desired trim on the aircraft.

Figure 3:
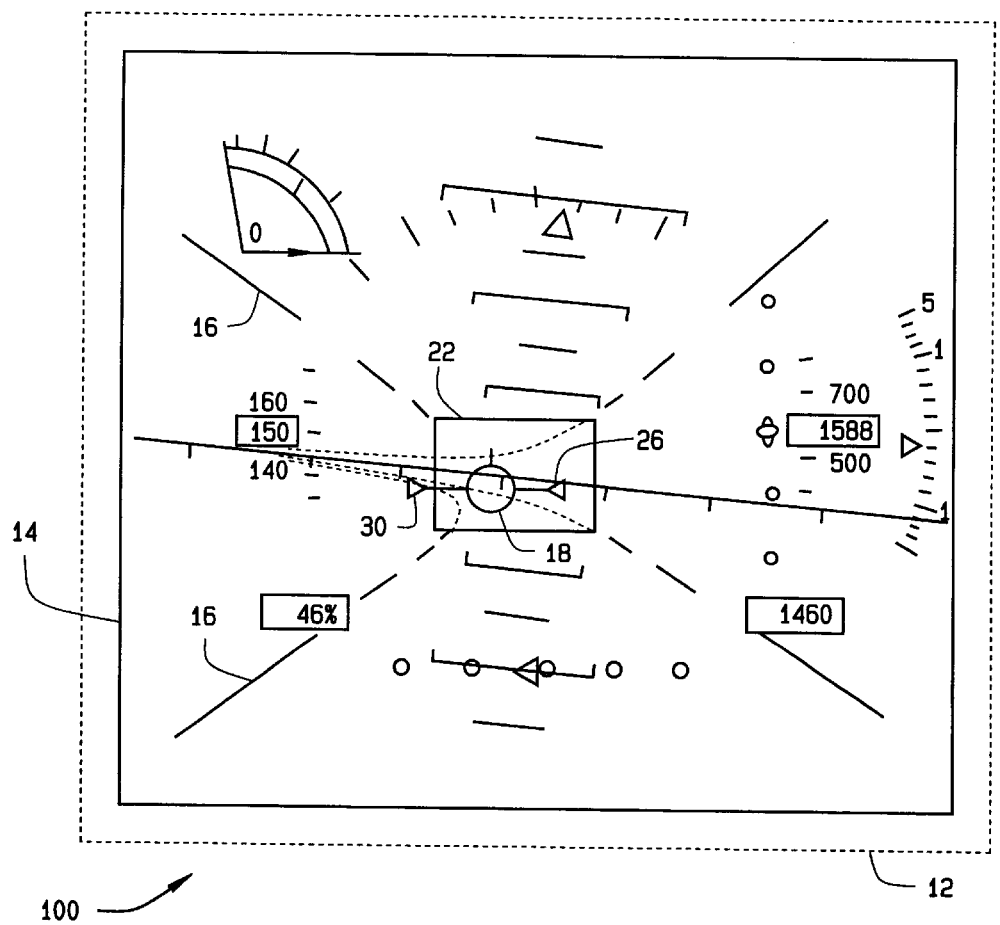
FIG. 3 is a graphical representation of the predictive flight path symbology system shown in FIG. 1 utilized with a 3D database.

PPFG symbology set 12 provides pilots of rotorcraft/tiltrotor, or any suitable airborne platform, with an intuitive symbology set. Using a high resolution two dimensional (2D) database (not shown), or three dimensional (3D) database (not shown), PPFG symbology set 12 combines precision waypoint geolocation with "quickened" predictive flight-path-vector and "tunnel-in-the-sky" pathway guidance. A 2D database displays PPFG symbology set 12 either overlaying a map type display or accompanied by a map type display, as shown in FIG. 1. A 3D database displays PPFG symbology set 12 either overlaying a synthetic vision type display or accompanied by a synthetic vision type display, as shown in FIG. 3 described below. Waypoint geolocation can be determined by any suitable positioning system, such as a global positioning system (GPS).

PPFG symbology set 12 provides an instrument approach guidance symbology system that enables pilots to execute steep (>4° glide slope) and normal (≦4° glide slope) precision instrument approaches during instrument meteorological conditions (IMC) flight and/or instrument flight rules (IFR) flight. Additionally, PPFG symbology set 12 enables a pilot to execute normal IMC flight, IFR flight, and low-altitude terrain flight/terrain avoidance (TF/TA), in near zero visibility. TF/TA symbology is driven by altitude data derived from a terrain digital map and DFAD/DFTED terrain elevation data. Aircraft position is provided by an INS/GPS update of actual aircraft position, which is updated and validated against an actual digital map position and an INS predicted position. Terrain elevation data from the terrain digital map, and aircraft altitude from an air data system and a radar altimeter, is provided to aircraft flight data computers. The elevation data and aircraft altitude are then compared against predicted, or required, aircraft actual altitude and a selected, or commanded, low altitude clearance altitude. Errors from commanded and actual, or predicted, elevation and aircraft position are provided to the pilot as the base of the tunnel pathway to be flown.

When employed on an aircraft guidance display, PPFG symbology set 12 presents a fully anticipatory perspective display, wherein the pilot has a pictorial display of the path to follow. PPFG symbology set 12 provides a tunnel type guidance system, which requires reduced pilot cognitive process because a pilot merely needs to "stay between the lines". The upper boundary of the open tunnel, formed by tunnel lines 16, acts as a power cue to indicate above glide slope conditions. An above glide slope condition indicates a requirement for increased descent gradients and power reduction and/or increase in rate of decent. PPFG symbology set 12 is anticipatory, such that it shows the pilot exactly where he is, and needs to be, thereby providing the pilot with an immediate indication of aircraft reaction to any control input, and immediately whether the control input satisfied a required demand.

QFPV 18 is quickened, such that QFPV 18 is temporally placed at a finite distance or period of time ahead of the aircraft. Thus, QFPV 18 points where the aircraft will be at that fixed future moment in time. This permits the pilot to anticipate the direction and amount of control input required to fly a required path, or track, as well as the predicted result of that input.

As shown in FIG. 1, the open tunnel bounded by broken lines 16 displays a predetermined amount of the tunnel, or pathway, thereby reducing display clutter. For example, only sixty seconds of the tunnel are displayed. Broken lines 16 provide flow field data by banking, climbing, descending, and turning as the pathway turns and descends or climbs. The tunnel, or pathway, provides anticipatory flight control input cues to the pilot. To fly the pathway, pilots keep QFPV 18 within quickened command frame 22, which is displayed temporally in front of the aircraft, for example 4.5 seconds. Tunnel height and width follow a $\frac{4}{5}^{ths}$ format that is linear as a function of airspeed. For example, tunnel height and width will vary from a maximum of 400×500 feet at air speeds above 250 KCAS to a minimum of 100×125 feet at air speeds less than, or equal to, 50 KCAS.

Quickened command frame 22, is 'quickened' to be a predetermined fixed distance, or period time, ahead of the aircraft path. Additionally, quickened command frame 22 remains displayed at the fixed distance, or period of time, in front of the aircraft regardless of air speed. Quickened command frame 22 is used to indicate a 'command location' in which the pilot places QFPV 18 to satisfy tracking requirements. QFPV 18 is designed to be coplanar and cotemporal with quickened command frame 22.

Pitch trim cue 26 is used to indicate the proper longitudinal pitch needed to maintain QFPV 18 within quickened command frame 22. In one embodiment, pitch trim cue is an orange delta displayed adjacent a right wing of QFPV 18. The pilot maintains a desired pitch of the aircraft by maneuvering the aircraft so that the right wing of QFPV 18 remains aligned with pitch trim cue 26. Power command cue 30 is used to indicate power requirements needed to maintain QFPV 18 within quickened command frame 22. In one embodiment, the power command cue 30 is a yellow delta adjacent a left wing of QFPV 18. The pilot maintains a desired power trim of the aircraft by maneuvering the aircraft so that the left wing of QFPV 18 remains level with power trim cue 30. By using pitch trim cue 26 and power command cue 30, a pilot nulls both a longitudinal trim command and a power command, thereby satisfying requirements to hold airspeed and altitude for a given computer commanded nacelle condition.

Figure 2:
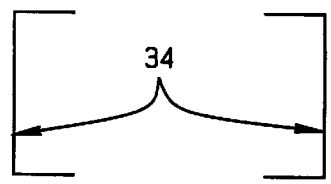
FIG. 2 shows a half bracket symbol included in the PPFG symbology set shown in FIG. 1.

FIG. 2 shows a half bracket symbol 34 included in PPFG symbology set 12 (shown in FIG. 1). FIG. 2 shows half bracket 34 in two configurations. In a first configuration, half bracket 34 is shown having legs extending in a first direction, for example right or down. In the second configuration, half bracket 34 is shown having legs extended in a second direction opposite the direction shown in the first configuration, for example left or up. Half bracket 34 indicates when the pilot is 'out of the tunnel'. Half bracket 34 is designed to be directional such that half bracket 34 indicates whether the tunnel is above, below, left, or right. By knowing were the tunnel is with respect to the aircraft the pilot can redirect the aircraft so that QFPV 18 (shown in FIG. 1) re-intercepts the tunnel. When a pilot utilizes half bracket 34 to guide the aircraft on a flight path that will cause QFPV 18 to re-intercept the tunnel, as the aircraft reaches a reciprocal heading, i.e. 180° of turn away from the tunnel, half bracket 34 will convert from the first configuration to the second configuration, thereby indicating that the pilot is now turning toward the tunnel. For example, when the pilot utilizes half bracket 34 having the first configuration, when the aircraft reaches a reciprocal heading half bracket 34 will convert to the second configuration.

FIG. 3 is a graphical representation of predictive flight path symbology system 100, including flight path vector based PPFG symbology set 12 (shown in FIG. 1) utilized with a 3D database (not shown). Components in FIG. 3 identical to components in FIG. 1 are identified in FIG. 3 using the same reference numerals as used in FIG. 1. While the two dimensional (2D) database illustrated in FIG. 1 displays data in two dimensions, for example height and width, the three dimensional (3D) database illustrated in FIG. 3 displays data in three dimensions, for example height, width, and depth, thereby depicting objects with perspective. When PPFG symbology set 12 is utilized with a 3D database, PPFG symbology set 12 is displayed either overlaying a synthetic vision type display or accompanied by a synthetic vision type display. Overlaying PPFG symbology set 12 on a synthetic vision display allows the pilot to not only see the course to flown, but the relationship of the underlying terrain. Therefore, little visual and mental interpretation by the pilot is required.

While the symbology set of the present invention is especially suited for use in aircraft having steep approach angles, or aircraft required to descend and decelerate to a hover, or near hover, the symbology set is not limited to such applications and is applicable for use in any aircraft. Effectively designed and implemented, PPFG symbology is capable of replacing traditional, workload intensive, Two-Bar and Delta-Veebar flight director terminal approach guidance while providing smaller flight technical error and reduced pilot workload.

The description of the invention is merely exemplary in nature and, thus, variations that do not depart from the essence of the invention are intended to be within the scope of the invention. Such variations are not toe be regarded as a departure from the spirit and scope of the invention.

What is claimed is:

1. A method for providing increased pilot situational awareness of an aircraft utilizing a predictive flight path symbology system, said method comprising:
   displaying a plurality of broken line symbols representing a predetermined amount of an open tunnel that provides anticipatory flight control input cues based on actual aircraft position and a predicted aircraft position;
   providing flow field data utilizing the broken line symbols, wherein the broken line symbols are adapted to bank, climb, descend and turn as the tunnel changes;
   displaying a half-bracket symbol to indicate when the aircraft is no longer in the open tunnel, wherein the half bracket includes a pair of legs extending from a cross-member in different directions to indicate whether the aircraft is at least one of above, below, to the right of and to the left of the open tunnel;
   displaying a quickened command reference frame a finite fixed period of time ahead of the aircraft to indicate a command location in which the pilot is to locate a quickened flight path vector (QFPV) symbol in order to satisfy on-course tracking requirements; and
   displaying the QFPV symbol such that the quickened QFPV symbol is cotemporal with the quickened command reference frame, thereby providing the pilot with predictive flight path information that points to where the aircraft will be at fixed future moment in time.

2. The method of claim 1 wherein displaying the half-bracket comprises utilizing the half-bracket in conjuction with the QFPV symbol to instruct the pilot which direction to guide the aircraft in order to re-intercept the tunnel.

3. The method of claim 1 wherein displaying the QFPV symbol comprises utilizing the QFPV symbol to determine aircraft velocity information.

4. The method of claim 1 wherein the PPFG symbology set further includes a longitudinal pitch trim symbol, and the QFPV symbol includes wings, and wherein displaying the QFPV symbol comprises displaying the longitudinal pitch trim symbol on the pilot display such that the pilot maintains a desired pitch of the aircraft by adjusting the trim of the aircraft in order to align the longitudinal pitch trim symbol with one of the wings of the QFPV symbol.

5. The method of claim 1 wherein the PPFG symbology set further includes a power trim symbol, and the QFPV symbol includes wings, and wherein displaying the QFPV symbol comprised displaying the power trim symbol on the pilot display such that the pilot maintains a desired trim of the aircraft by adjusting power of the aircraft in order to position the power trim symbol level with one of the wings of the QFPV symbol.

6. A predictive flight path symbology system for providing increased pilot situational awareness of an aircraft comprising:
   a pilot display; and
   a precision pathway flight guidance (PPFG) symbology set configured to be displayed on said pilot display, said PPFG symbology set comprising:
      broken line symbols representing a predetermined amount of an open tunnel that provides anticipatory flight control input cues based on actual aircraft position and a predicted aircraft position, wherein the broken lines are adapted to bank, climb, descend and turn to provide flow field data as said tunnel changes;

a half-bracket symbol that indicates when the aircraft is no longer in the open tunnel represented by said broken line symbols, wherein the half bracket includes a pair of legs extending from a cross-member in different directions to indicate whether the aircraft is a least one of above, below, to the right of and to the left of the open tunnel;

a quickened flight path vector (QFPV) symbol that provides the pilot with predictive flight path information that points to where the aircraft will be at a fixed future moment in time; and a quickened command reference frame that is displayed a finite fixed period of time ahead of the aircraft, to indicate a command location in which the pilot is to locate said QFPV symbol in order to satisfy on-course tracking requirements, and wherein said QFPV symbol is cotemporal with said quickened command reference frame.

7. The symbology system of claim 6 wherein said half-bracket configured to be utilized in conjuction with said QFPV symbol to instruct the pilot which direction to guide the aircraft in order to re-intercept the tunnel.

8. The symbology system of claim 6 wherein said QFPV symbol configured to indicate aircraft velocity information.

9. The symbology system of claim 6, wherein said symbology set further comprises a longitudinal pitch trim symbol, and said QFPV symbol includes wings, wherein said longitudinal pitch trim symbol configured to maintain a desired pitch of the aircraft by the pilot aligning said longitudinal pitch trim symbol with one of the wings of said QFPV symbol.

10. The symbology system of claim 6, wherein said symbology set further comprises a power trim symbol, and said QFPV symbol includes wings, wherein said power trim symbol configured to maintain a desired trim of the aircraft by the pilot adjusting power of the aircraft in order to position said power trim symbol level with one of the wings of said QFPV symbol.

11. A precision pathway flight guidance (PPFG) symbology set for providing increased pilot situational awareness of an aircraft comprising:

broken line symbol representing a predetermined amount of an open tunnel that provides anticipatory flight control input cues based on actual aircraft position and a predicted aircraft position, wherein the broken lines are adapted to bank, climb, descend and turn to provide flow field data as the tunnel changes;

a half-bracket symbol that indicates the aircraft is no longer in the open tunnel represented by said broken line symbols, wherein the half bracket includes a pair of legs extending from a cross-member in different directions to indicate whether the aircraft is at least one of above, below, to the right of and to the left of the open tunnel;

a quickened flight path vector (QFPV) symbol that provides the pilot with predictive flight path information that points to where the aircraft will be a fixed future moment in time;

a quickened command reference frame displayed a finite fixed period of time ahead of the aircraft, to indicate a commanded location in which the pilot is to locate said QFPV symbol in order to satisfy on-course tracking requirements, and wherein said QFPV symbol is cotemporal with said quickened command reference frame;

a longitudinal pitch trim symbol configured to maintain a desired pitch of the aircraft by the pilot adjusting the trim of the aircraft to align said longitudinal pitch trim symbol with said QFPV symbol; and a power trim symbol configured to maintain a desired trim of the aircraft by the pilot adjusting power of the aircraft in order to position said power trim symbol level with said QFPV symbol.

12. The symbology set of claim 11 wherein said half-bracket configured to be utilized in conjunction with said QFPV symbol to instruct the pilot which direction to guide the aircraft in order to re-intercept the tunnel.

13. The symbology set to claim 11 wherein said QFPV symbol configured to indicate aircraft velocity information.

14. The method of claim 1, wherein displaying a plurality of broken line symbols representing a predetermined amount of an open tunnel that provides anticipatory flight control input cues comprises determining the actual aircraft position using waypoint geo-references and altitude data derived from a terrain digital map.

15. The method of claim 14, wherein determining the actual aircraft position using waypoint geo-references comprises determining the actual aircraft position using a global positioning system (GPS).

16. The method of claim 1, wherein displaying a plurality of broken line symbols representing a predetermined amount of an open tunnel that provides anticipatory flight control input cues comprises determining where the aircraft will be at a fixed future time using an inertial navigation system (INS).

17. The method of claim 1, wherein displaying a half-bracket symbol to indicate when the aircraft is no longer in the open tunnel comprises extending the legs from the cross-member in a first direction when the aircraft has a heading in the direction of the open tunnel and extending in a second direction from the cross member when the aircraft has a heading approximately 180 degrees of turn away from the open tunnel.

18. The symbology system of claim 6, wherein the actual aircraft position is determined using waypoint geo-references and altitude data derived from a terrain digital map.

19. The symbology system of claim 18, wherein the waypoint geo-references are determined using a global positioning system (GPS).

20. The symbology system of claim 6, wherein the predicted aircraft position is determined using an inertial navigation system (INS) to indicate where the aircraft will be at a fixed future time.

21. The symbology system of claim 6, wherein the legs of the half-bracket symbol extend from the cross-member in a first direction when the aircraft has a heading in the direction of the open tunnel and extend in a second direction from the cross member when the aircraft has a heading approximately 180 degrees of turn away from the open tunnel.

* * * * *